United States Patent

Kannan

[11] Patent Number: 5,207,930
[45] Date of Patent: May 4, 1993

[54] FILTRATION SYSTEM WITH HELICAL FILTER CARTRIDGE

[75] Inventor: Raghavachari Kannan, Newtown Square, Pa.

[73] Assignee: Crane Company, New York, N.Y.

[21] Appl. No.: 738,152

[22] Filed: Jul. 30, 1991

[51] Int. Cl.⁵ .................. B01D 29/62; B01D 29/48
[52] U.S. Cl. .................... 210/791; 210/350; 210/354; 210/356; 210/483; 210/497.1; 210/767
[58] Field of Search ............ 210/350, 497.1, 767, 210/791, 793, 354, 356, 391, 393, 455, 459, 483

[56] References Cited

U.S. PATENT DOCUMENTS

| | | | |
|---|---|---|---|
| 2,429,417 | 10/1947 | Magill | 210/497.1 |
| 2,475,561 | 7/1949 | Cooperider et al. | 210/497.1 |
| 2,517,825 | 8/1950 | Ashcraft | 210/497.1 |
| 2,569,748 | 10/1951 | De Grave | 210/497.1 |
| 2,622,738 | 12/1952 | Kovacs | 210/497.1 |
| 2,667,271 | 1/1954 | Tursky | 210/497.1 |
| 2,785,804 | 3/1957 | Fernandez | 210/497.1 |
| 3,179,116 | 4/1965 | Jacobs | 210/497.1 |
| 3,279,610 | 10/1966 | Scholten et al. | 210/497.1 |
| 3,487,931 | 1/1970 | Paulson | 210/497.1 |
| 4,199,454 | 4/1980 | Sartore | 210/222 |
| 4,237,978 | 12/1980 | Calderon et al. | 210/497.1 |
| 4,260,016 | 4/1981 | Calderon | 210/497.1 |
| 4,664,814 | 5/1987 | Backman et al. | 210/356 |
| 4,714,552 | 12/1987 | Tabor | 210/411 |
| 4,783,259 | 11/1988 | Wade | 210/169 |
| 4,804,481 | 2/1989 | Lennartz | 210/497.1 |
| 5,053,129 | 10/1991 | Kitson | 210/455 |

Primary Examiner—Robert A. Dawson
Assistant Examiner—Sun Uk Kim
Attorney, Agent, or Firm—Woodcock, Washburn, Kurtz, Mackiewicz & Norris

[57] ABSTRACT

A filtration system utilizing a helical cartridge wherein the differential in pressure between the pressure inside and the pressure outside of the helix is effective in controlling the spacing between the coils of the helix. Each coil of the helix is provided with radial grooves of predetermined size corresponding to the smallest particle size to be trapped by the cartridge and prevented from entering the interior of the helix. The coils are maintained closed during the filtering cycle and are opened during the backwash cycle.

8 Claims, 2 Drawing Sheets

FILTRATION SYSTEM WITH HELICAL FILTER CARTRIDGE

FIELD OF THE INVENTION

The present invention relates to filtration systems for separating solid particles from liquid and particularly to a filtration system utilizing a helical filter cartridge.

BACKGROUND OF THE INVENTION

In the process of filtration, cartridges are used to separate the solid particles from liquid. Filter cartridges are generally of hollow cylindrical shape. The surface of the cylinder usually contains fine openings. When liquid passes from outside of the cylinder to the inside, these openings will trap and retain all solid particles larger than their own size. Such cartridges are installed inside a vessel and the liquid will be passed through them under pressure. The cylindrical surfaces can be made of metal, plastic or fiber. The size of the openings will determine the particle size to be trapped and the rate of flow of liquid. Once the particles start filling up the openings, this restriction will cut down the flow. When the particles fill up all the openings, the cartridge is then referred to as being "blinded". Once the cartridge is blinded, it is necessary to remove it. The majority of blinded cartridges cannot be reused and must be discarded. In some systems the cartridge may be taken out and mechanically cleaned or chemically cleaned and if they are still functional, they may be reused. This results in expensive down time and/or wasted cartridges and adds to the cost of the filtration process.

In some prior art filtration systems, strainers in the form of a helical strip of metal or other suitable material have been used. One example is shown in U.S. Pat. No. 2,569,748. In that patent the dirty liquid is flowing from inside the helix to outside the helix. The coils of the helix are spaced apart a predetermined distance to prevent the passage of predetermined size solids outwardly between the coils. The strainer apparatus in that patent is of the backwash type in which a counter-flow of liquid is employed to remove solids form the spaces between the coils of the helix to increase the spacing between the coils. Other helical coil filters are shown in U.S. Pat. Nos. 2,517,825, 3,179,116 and 4,804,481.

SUMMARY OF THE INVENTION

It is an object of the present invention to provide a filtration system utilizing a helical cartridge wherein the differential in pressure between the pressure inside and the pressure outside of the helix is effective in controlling the spacing between the coils of the helix.

In accordance with the present invention there is provided a filtration system for separating solid particles from liquid. The system comprises a vessel having an inlet for unfiltered liquid and an outlet for filtered liquid. A partition is provided within the vessel separating the inlet from the outlet. A filter cartridge is supported at one end within an opening in the partition and adjacent the inlet. The cartridge comprises a flexible ribbon in the form of a helix having a plurality of helical coils extending around the longitudinal axis of the helix, each of the coils having a plurality of radial grooves in at least one face of the ribbon. The grooves are of predetermined size corresponding to the smallest particle size to be trapped by the cartridge and prevented from entering the interior of the helix. The helical coils are sandwiched between a housing and a bottom plate. The housing is connected to the partition and has an opening extending axially therethrough. A central spindle extends along the longitudinal axis of the helix and has a top end attached to the housing and a bottom end extending through the bottom plate. A coil spring is positioned on one end of the spindle and means is provided on the spindle for cooperation with the spring in applying a force to the helix in the axial direction to maintain the helical coils in closed position.

In accordance with a further aspect of the invention there is provided a method of separating solid particles from liquid using the filtration system described above. The method comprises the steps of directing an unfiltered liquid into the inlet of the vessel and around the exterior of the helix at a pressure greater than the pressure existing inside the helix, the differential in the pressure causing the bottom plate to move upwardly thereby causing all of the helical coils to be compressed against one another whereby the liquid will pass through the radial grooves in the helical coils to the interior of the helix except for solid particles of the size at least as large as the size of the radial grooves. The method further comprises the step of directing the filtered liquid from the interior of the helix through the openings in the housing and the partition to the outlet of the vessel.

Further in accordance with the invention there is provided a method of backwashing solid particles from the cartridge of the filtration system. The method comprises the steps of directing clean liquid into the outlet of the vessel and through the interior of the helix at a pressure greater than the pressure existing outside the helix. The differential in pressures causing the force within the helix to push the bottom plate downwardly and simultaneously the force acts radially to separate the adjacent helical coils one from the other so that the clean liquid will pass through all of the coils concurrently resulting in a uniform flow of liquid through the grooves in the helical coils whereby the clean liquid washes out the plurality of radial grooves and removes the trapped particles.

In accordance with another aspect of the invention there is provided a filter cartridge for separating solid particles from liquid comprising a flexible ribbon in the form of a helix having a plurality of helical coils extending around the longitudinal axis of the helix. Each of the coils has a plurality of radial grooves in at least one face of the ribbon. The helical coils are sandwiched between a top plate and a bottom plate, the top plate having openings extending axially therethrough and attached to a housing. A central spindle extends along the longitudinal axis of the helix and has a top end attached to the housing and a bottom end extending through the bottom plate. A coil spring is positioned on the spindle between one of the plates and the adjacent end of the spindle for compressing the helical coils of the helix between the plates.

DETAILED DESCRIPTION OF THE INVENTION

Figure 1:
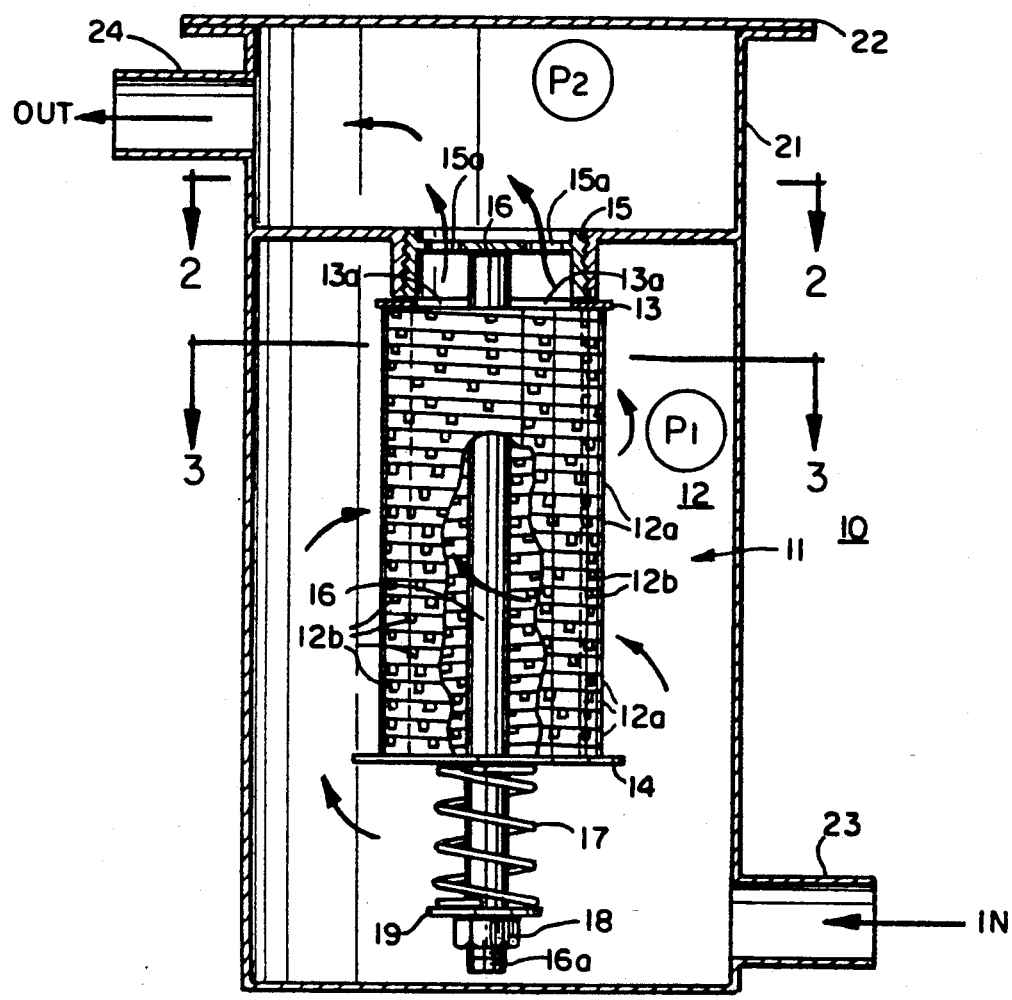
FIG. 1 is a vertical sectional view of a filtration system for separating solid particles from liquid using a helical filter cartridge embodying the present invention and showing the system in filtering condition.
Figure 2:
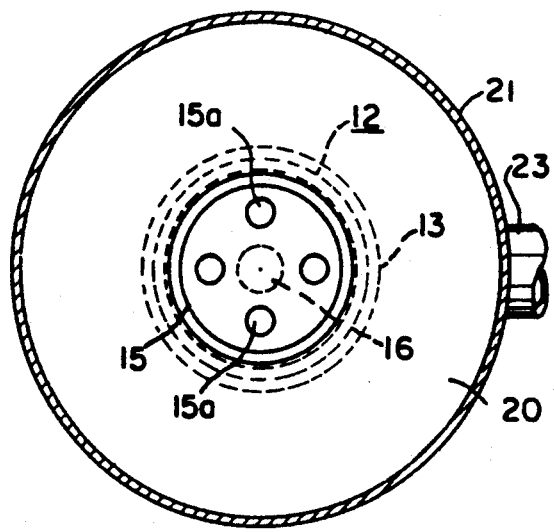
FIG. 2 is a sectional view taken along the lines 2—2 in FIG. 1.
Figure 3:
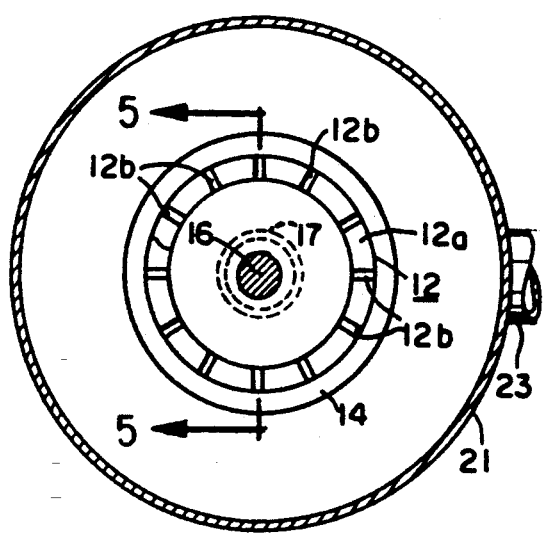
FIG. 3 is a sectional view taken along the lines 3—3 in FIG. 1.
Figure 5:
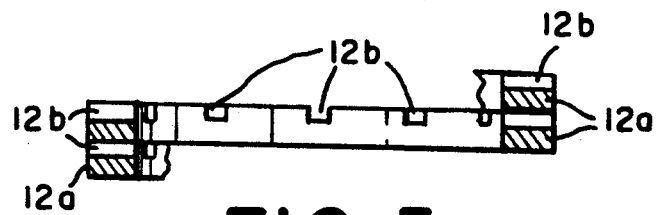
FIG. 5 is a sectional view taken along the lines 5—5 in FIG. 3 showing adjacent coils in the helix and the grooves in each coil.

Referring to FIG. 1 there is illustrated a filtration system 10 for separating solid particles of liquid using a helical filter cartridge 11 embodying the present invention and showing the system in filtering condition. The cartridge 11 comprises a flexible ribbon in the form of a helix 12 having a plurality of helical coils 12a extending around the longitudinal axis of the helix. Each of the coils 12a has a plurality of radial grooves 12b in at least one face of the ribbon, FIGS. 1, 3 and 5. The helical coils 12a are sandwiched between a top plate 13 and a bottom plate 14, FIG. 1. The top plate 13 has openings 13a extending axially therethrough and is attached to a housing 15 which also has openings 15a, FIGS. 1 and 2, extending axially therethrough. A central spindle 16 extends along the longitudinal axis of the helix 12. The top end of the spindle 16 is attached to the housing 15 and the bottom end of the spindle 16 extends through the bottom plate 14. A coil spring 17 is positioned on the spindle 16 for applying a force to the helix 12 in the axial direction to maintain the helical coils in closed position. In the embodiment illustrated in FIG. 1 the bottom end of the spindle 16 is threaded at 16a and a nut 18 is provided thereon for adjusting the force of the spring 17 applied to the helix 12. As shown in FIG. 1 the spring 17 is positioned between the bottom plate 14 and a washer 19 on the spindle 16. Thus the spring 17 is supporting the bottom plate 14.

As shown in FIG. 1 the housing 15 of the cartridge 11 is adapted to be secured in an opening in a partition plate 20 within a vessel 21. The vessel 21 is provided with a cover plate 22 which is secured to the vessel 21 in any suitable manner. In the embodiment illustrated in FIG. 1 the housing 15 of cartridge 11 is provided with threads which are adapted to mate with corresponding threads in the partition plate 20. It is to be understood that the housing 15 may be secured to the partition plate 20 by other suitable means such for example as a friction fit. The vessel 21 is provided with an inlet 23 for unfiltered liquid and an outlet 24 for filtered liquid. The partition 20 within the vessel 21 separates the inlet 23 from the outlet 24 thus requiring the liquid to flow through the cartridge 11 in the direction of the arrows shown in FIG. 1.

During the filtering or service cycle, as shown in FIG. 1, the liquid to be filtered enters the vessel 21 through the inlet 23 and surrounds the exterior of the helix 12. The liquid tries to pass from outside of the helix 12 towards the inside. The pressure $P_1$ existing outside the helix 12 will be greater than the pressure $P_2$ existing inside the helix 12 and above the partition 20. This differential force will cause the bottom plate 14 to move upwardly. The spring 17 below the bottom plate 14 will supplement this force and all of the coils 12a in the helix 12 will be compressed so that there are no spaces between the coils. The only passage for the liquid from the outside of the helix 12 to the inside will be by way of the grooves 12b which extend radially through the coils 12a of the helix 12. Any solid particles larger than the dimensions of the grooves 12b will be prevented from entering the interior of the helix 12.

Thus it will be seen that filtration takes place when the system is in the condition illustrated in FIG. 1. As the filtration progresses, at some point of time thereafter, the solid particles in the dirty liquid being filtered will fill up grooves 12b in the coils 12a and try to block the passage of liquid. At this time the grooves 12b are being "blinded". Consequently, this restriction will cut down the flow of liquid to the interior of the helix 12 and eventually flow stops.

Figure 4:
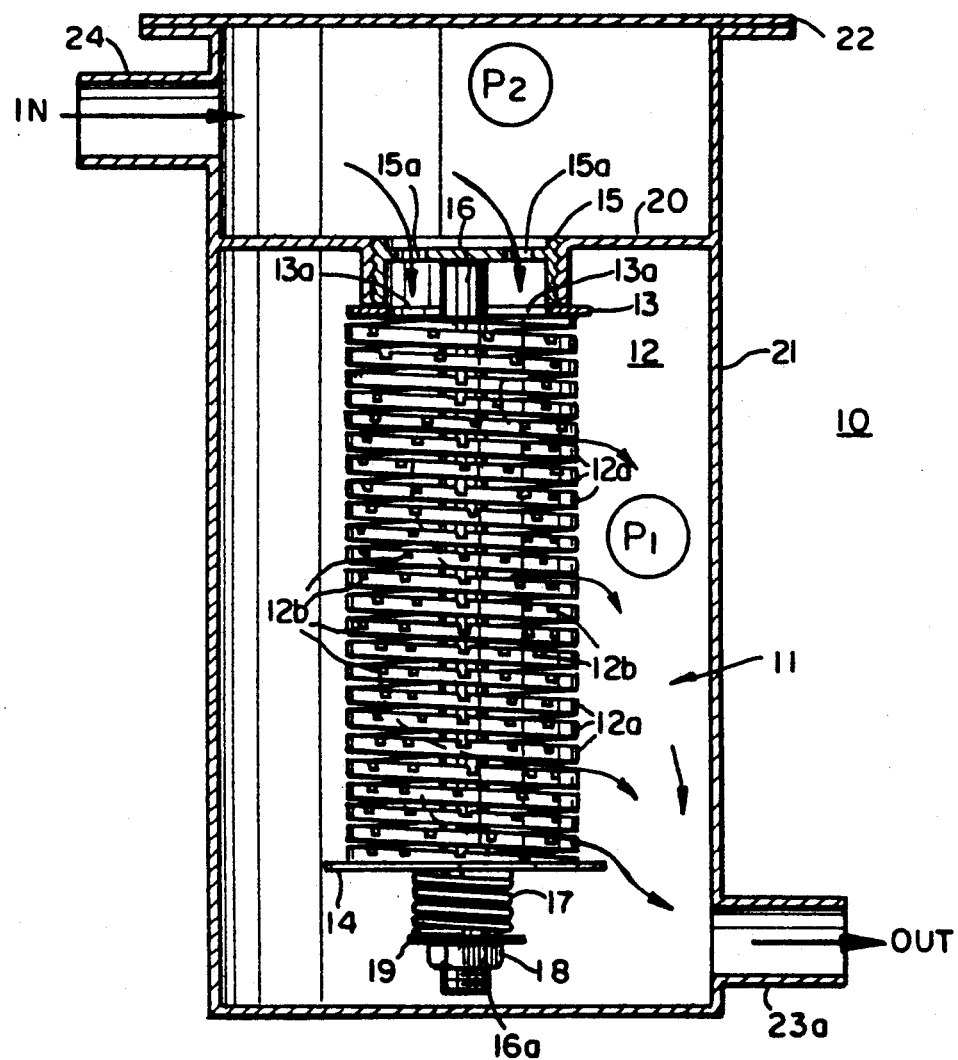
FIG. 4 is a vertical sectional view similar to FIG. 1 but showing the system in backwash condition.

In order to correct the "blinded" condition of the helix 12 a clear liquid i.e. water is forced from inside of the coils of the helix 12 towards the outside. As shown in FIG. 4, the direction of flow of liquid is reversed by a suitable known valve arrangement, not shown, with the clear liquid now entering the duct 24. At this time, the pressure $P_2$ within the helix 12 will be greater than the pressure $P_1$ outside of the helix 12. This differential in pressures causes the force within the helix 12 to push the bottom plate 14 downwardly and simultaneously the force acts radially to separate the adjacent coils 12a of the helix 12 one from the other so that the clear liquid will pass through all of the coils 12a concurrently resulting in a uniform flow of liquid through the grooves 12b in the helical coils 12a and the trapped particles will be flushed out of the system by way of the conduit 23. This operation of the system as shown in FIG. 4 is referred to as the backwash cycle. Once the backwash cycle is completed, the service cycle can be resumed in the manner illustrated in FIG. 1. Thus it will be seen that with the filtration system as described above the backwash water will clean the grooves 12b in the coils of the helix 12 and there is no need to remove the cartridge 11 from the vessel 21 for cleaning.

From the foregoing it will be seen that the basic principle upon when the filtration system 10 operates is that when there is sufficient hydraulic force within the helix 12, acting towards the outside of the helix 12, the bottom plate 14 will compress the spring 17 and the bottom plate 14 will move down. Since all of the coils 12a of the helix 12 are connected to each other, all of the coils 12a will separate from each other in an equal and uniform fashion. The gap between adjacent coils 12a will remain the same. When there is a hydraulic force acting in the opposite direction, the bottom plate 14 will move upwardly. The spring 17 will expand and assist this movement thereby compressing all of the coils 12a of the helix against one another.

The flexible ribbon which forms the helix 12 may be made of metal or any other suitable flexible material capable of having radial grooves formed therein. It is to be understood that the ribbon of the helix 12 is flexible in nature and is not in the form of a coil spring. By reason of this flexible characteristic in the helix, the individual coils will separate from each other during the backwash cycle and thus insure a proper and thorough cleaning of the radial grooves in the coils. During the backwash cycle, the hydraulic force pushes down the bottom plate 14 and simultaneously the force acts radially and separates all the adjacent coils 12a of the helix 12 so that the liquid will pass through all of the coils at the same time. This will result in a uniform flow of liquid through the grooves 12b in the helical coils 12a. There is a definite reason for choosing a flexible ribbon rather than a compression coil spring for the helix. The reason for not making the helix out of a compression coil spring is as follows: During the back wash cycle, when the hydraulic force tries to push down the bottom plate, due to the inherent behaviour of any compression spring coil, only a few coils at the top and a few coils at the bottom will open up and eventually the liquid will pass through only those end coils and not through the middle coils; t is will result in inefficient cleaning. By providing the helix 12 with radial grooves 12a the helix will have a higher capacity to retain the particles and an increased filtration will take place. Since the liquid flow during the service cycle as shown in FIG. 1 takes place from "out" to "in" with respect to the helix 12, the filtration phenomenon will take place in two important ways. First, the larger outer cylindrical surface of the helix behaves as a screen filter to collect the larger particles being filtered and second, the grooves 12b extending radially through the coils 12a will trap the finer particles by adhesion.

While the system illustrated in the drawing shows the spring 17 located at the bottom of the cartridge 11, it is to be understood that depending upon the application the spring may be located at the top of the cartridge.

What is claimed is:

1. A filter cartridge for separating solid particles from liquid in a filtration system comprising a cylindrical housing for supporting the cartridge in the system, said housing having a partition having openings extending axially therethrough, a flexible ribbon in the form of a helix having a plurality of helical coils extending around a longitudinal axis of the helix, each of said coils having a plurality of radial grooves in at least one face of the ribbon, a bottom plate for engaging the bottom end of said helix, said helical coils being sandwiched between the bottom of said housing and said bottom plate, a central rod extending along the longitudinal axis of said helix and having a top end attached to the housing partition and a bottom end extending through said bottom plate, a coil spring on the bottom end of said rod, and means on said bottom end of said rod for cooperation with said spring in applying a force to said helix in the axial direction to maintain the helical coils in closed position.

2. A filter cartridge according to claim 1 including a top plate positioned between the bottom of said housing and the top end of said helix, said top plate having openings extending axially therethrough.

3. A filter cartridge according to claim 1 wherein the bottom end of said rod is threaded and a nut is provided thereon for adjusting the force of said spring applied to said helix.

4. A filter cartridge for separating solid particles from liquid in a filtration system comprising a cylindrical housing for supporting the cartridge in the system, said housing having a partition having openings extending axially therethrough, a top plate having openings extending axially therethrough and attached to the bottom of said housing, a flexible ribbon in the form of a helix having a plurality of helical coils extending around the longitudinal axis of the helix, each of said coils having a plurality of radial grooves in at least one face of the ribbon, a bottom plate for engaging the bottom end of said helix, said helical coils being sandwiched between said top plate and said bottom plate, a central rod extending along the longitudinal axis of said helix and having a top end attached to the housing partition and a bottom end extending through said bottom plate, and a coil spring on said rod between said bottom plate and the adjacent end of said rod or compressing said helical coils of said helix between said plates.

5. A filter cartridge according to claim 4 wherein means is provided at the bottom end of said rod for holding said spring against said bottom plate thereby applying a force to said helix in the axial direction of said housing.

6. A filtration system for separating solid particles from liquid comprising a vessel having an inlet for unfiltered liquid and an outlet for filtered liquid, a partition within said vessel separating said inlet from said outlet, a filter cartridge supported at one end within an opening in said partition and adjacent the inlet, said cartridge comprising a cylindrical housing for supporting the cartridge in the opening in said partition, said housing having a partition having openings extending axially therethrough, a flexible ribbon in the form of a helix having a plurality of helical coils extending around the longitudinal axis of the helix, each of said coils having a plurality of radial grooves in at least one face of the ribbon, said grooves being of predetermined size corresponding to the smallest particle size to be trapped by the cartridge and prevented from entering the interior of the helix, a bottom plate for engaging the bottom end of said helix, said helical coils being sandwiched between the bottom of said housing and said bottom plate, a central rod extending along the longitudinal axis of said helix and having a top end attached to the housing partition and a bottom end extending through said bottom plate, a coil spring on the bottom end of said rod, and means on said bottom end of said rod for cooperation with said spring in applying a force to said helix in the axial direction to maintain the helical coils in closed position.

7. A method of separating solid particles from liquid using the filtration system of claim 6 comprising the steps of directing an unfiltered liquid into the inlet of the vessel and around the exterior of said helix at a pressure greater than the pressure existing inside said helix, the differential in said pressure causing said bottom plate to move upwardly thereby causing all of the helical coils to be compressed against one another whereby the liquid will pass through the radial grooves in said helical coils to the interior of the helix except for solid particles of a size at least as large as the size of said radial grooves, and directing the filtered liquid from the interior of the helix through the openings in the housing and the partition to the outlet of the vessel.

8. A method of backwashing solid particles from the cartridge of the filtration system of claim 6 comprising the steps of directing clean liquid into the outlet of the vessel and through the interior of said helix at a pressure greater than the pressure existing outside of said helix, the differential in pressures causing the force within the helix to push the bottom plate downwardly and simultaneously the force acts radially to separate the adjacent helical coils one from the other so that the clean liquid will pass through all of the coils concurrently resulting in a uniform flow of liquid through the grooves in the helical coils whereby the clean liquid washes out said plurality of radial grooves and removes the trapped particles.

* * * * *